United States Patent Office 3,262,813
Patented July 26, 1966

3,262,813

MAGNETIC RECORDING MEDIUM COATED WITH A BINDER COPOLYMER OF BUTADIENE, ACRYLONITRILE, AND A HYDROXY METHACRYLATE

Dervin L. Flowers, Redwood City, Calif., assignor to Ampex Corporation, Redwood City, Calif., a corporation of California No Drawing. Filed Nov. 19, 1963, Ser. No. 324,865
2 Claims. (Cl. 117—161)

This invention relates to a novel polymer having excellent dispersing properties. The polymer is thermoplastic and produces excellent films when applied to a surface as a solution and the solvent permitted to evaporate. The films have excellent adhesion and have a high surface smoothness. Since the polymer has good dispersing properties, it is useful in suspending finely divided particles such as pigments. Such dispersions can then be mixed with other polymers or can be used without further mixture.

The polymer system of the present invention is particularly useful as a binder in making magnetic recording tapes wherein finely divided magnetic particles are dispersed in a binder and applied to a plastic backing which may be in the form of a tape, disc, belt or the like. Thus, the novel polymer of the present invention is largely described in terms of tape manufacture, although it will be recognized that the polymer is one of general utility.

When magnetic tapes are used for exacting purposes such as in video recorders and in data information systems, it is important that the tape have a long, useful life and that it have a very smooth surface. This is particularly true when the tape base is Mylar (polyethylene terephthalate); such bases have extremely long life so that the binder used for the magnetic particles is ordinarily the limiting factor with respect to tape life. Heretofore, various mixtures of polymers have been proposed to secure the necessary adhesion, flexibility, toughness and wear properties which contribute to long life but such mixtures have been ordinarily difficult to work with and many of them require elaborate curing techniques.

An object of the present invention is to provide a novel polymer having good dispersing properties for finely divided particles.

A further object of the present invention is to provide a binder for magnetic tapes which has good adhesion, flexibility and toughness and which has long wearing properties.

Another object of this invention is to provide a novel polymer system for use as a tape binder which produces a tape having a very smooth surface.

A still further object of this invention is to provide a tape binder made of a single polymer which is easy to work with and which does not require elaborate mixing and curing techniques.

Another object of the present invention is to provide a binder for magnetic tapes wherein the binder itself acts as a dispersing agent for the magnetic particles, eliminating or reducing the quantity of the dispersing agents heretofore used in tape manufacture.

Other objects will be apparent from the balance of the specification.

In accordance with the present invention, a copolymer is prepared by combining acrylonitrile, butadiene and a hydroxy methacrylate. The hydroxy methacrylate is selected from 2-hydroxy ethyl methacrylate and, preferably, 2-hydroxy propyl methacrylate. The materials are mixed together in the presence of a suitable solvent such as benzene, toluene, xylene or n-heptane or mixtures thereof and heated in a vessel in the presence of a free radical-producing polymerization catalyst until polymerization is complete. Suitable catalysts include 2,2′-azo-bis-isobutyronitrile, benzoyl peroxide and ditertiary butyl peroxide. Generally speaking, temperatures of from about 60° C. to 150° C. are suitable for conducting the polymerization reaction. Preferably, the temperature selected is one suited to the activity of the catalyst. Thus, with ditertiary butyl peroxide a temperature of about 120° C. is suitable, with 2,2′-azo-bis-isobutyronitrile 65° C. is suitable, and with benzoyl peroxide 85° C. is suitable. Polymerization is ordinarily complete in from about 6 to 18 hours. The reaction is ordinarily conducted in a closed pressure vessel under the pressure developed by the reactants.

Various proportions of the ingredients can be used in producing the copolymer of the present invention. Thus, from about 20% to 80% by weight of acrylonitrile can be used with 20% to 60% of butadiene and from 3% to 30% of the hydroxy methacrylate. From 20% to 80% of the resin components can be used with the balance being a suitable solvent as described above.

After polymerization is complete, the polymer may be recovered and dissolved in a suitable solvent, but this is not ordinarily necessary since the polymer is normally employed as a dilute solution in the same or a compatible solvent as the solvent employed during polymerization. Thus, it is only necessary to determine the percentage of solids in the reaction mixture and then adjust the mixture to the desired solids content either by evaporating off excess solvent or by diluting with additional solvent. In tape making, a dilute solution is ordinarily employed so that the mixture is adjusted to contain about 20% by weight of the resin solids while the balance is solvent. To this solution is then added the desired magnetic pigment, the amount of the pigment being from about 60% to 80% by weight, based on the resin solids present in the solution. The mixture is then subjected to violent agitation as in a paint mixer or in a ball mill for a period of time ranging from a few minutes to a few hours. The solution is then coated on a plastic tape using well known coating techniques such as a knife coater, gravure coater, or the like. The coated tape is then passed through an oven to drive off the solvent and is immediately ready for spooling or use. Although the base is preferably Mylar because of its long wearing properties, other bases such as polypropylene, cellulose acetate or polyvinyl chloride may be used.

The following non-limiting examples illustrate various embodiments of the present invention.

*Example 1*

120 g. of acrylonitrile, 6 g. of 2-hydroxy propyl methacrylate and 300 g. of toluene were mixed and de-oxygenated in a reaction vessel by bubbling nitrogen through the mixture for ten minutes. To this mixture was then added 0.7 g. of 2,2′-bis-azo-isobutyronitrile as a polymerization catalyst. The reaction vessel, equipped with a needle valve, was then capped. Subsequently, 74 g. of butadiene was metered into the reaction vessel through the needle valve as a gas, butadiene being readily soluble in toluene. The needle valve was then closed and the reaction vessel was heated to 65° C. for 18 hours. Polymerization was thus effected at this temperature. The polymer yield was 63%. The polymer obtained, which polymer contained unreacted material as well as solvent, was dissolved in a 30/40/30% by volume mixture of toluene, methyl ethyl ketone and tetrahydrofuran. A 20% by weight polymer in solvent solution was thus prepared. To this latter solution was added 75% by weight of gamma-ferric oxide based on the polymer solids present in the solution. The oxide-polymer solution was violently agitated in a paint mixer for 30 minutes and knife-coated on one mil Mylar base film. The film was dried by passing it through a three-zone oven heated to 175° F. in the first zone and 225° F. in the second and third zones. Total residence time was 40 seconds. No substantial further polymerization occurs in the oven, it being only necessary to drive off the solvent. Dispersion of the oxide in this media was excellent as indicated by photomicrographs of the surface. Adhesion of the polymer-oxide mixture to Mylar base film was also excellent as indicated by the "Scotch tape" adhesion test. It will be noted that it was not necessary to employ a separate dispersing agent for dispersing the pigment in the polymer, as is usual in the tape-making art.

In the following examples, only the polymer preparation is given. In each instance the polymer was suitable for use in the making of magnetic recording tapes as set forth in Example 1.

*Example 2*

A polymer was prepared as in Example 1 except the polymerization catalyst was 0.7 g. of ditertiary butyl peroxide initiated at 120° C. for 18 hours. Polymer yield was 58%.

*Example 3*

A polymer was prepared as in Example 2 except for different monomer ratios used. 120 g. of acrylonitrile, 12 g. of 2-hydroxy propyl methacrylate and 68 g. of butadiene were mixed using 0.7 g. of ditertiary butyl peroxide as catalyst and polymerized at 120° C. for 18 hours. Polymer yield was 60%.

*Example 4*

A polymer was prepared as in Example 2 except for different monomer ratios used. 86 g. of acrylonitrile, 24 g. of 2-hydroxy propyl methacrylate and 90 g. of butadiene were mixed using 0.7 g. of ditertiary butyl peroxide as a catalyst and polymerized at 120° C. for 18 hours. Polymer yield was 59%.

*Example 5*

A polymer was prepared as in Example 2 but different monomer ratios were used. 100 g. of acrylonitrile, 32 g. of 2-hydroxy propyl methacrylate and 68 g. of butadiene were mixed using 0.7 g. of ditertiary butyl peroxide as a catalyst and polymerized at 120° C. for 18 hours. Polymer yield was 62%.

*Example 6*

A polymer was prepared as in Example 2 but different monomer ratios were used. 50 g. of acrylonitrile, 50 g. of 2-hydroxy propyl methacrylate and 100 g. of butadiene were mixed using 0.7 g. of ditertiary butyl peroxide as a catalyst and polymerized at 120° C. for 18 hours. Polymer yield was 49%.

*Example 7*

A polymer was prepared as in Example 2 but different monomer ratios were used. 80 g. of acrylonitrile, 52 g.

of 2-hydroxy propyl methacrylate and 68 g. of butadiene were mixed using 0.7 g. of ditertiary butyl peroxide as a catalyst and polymerized at 120° C. for 18 hours. Polymer yield was 60%.

*Example 8*

The procedure was the same as Example 2 but the hydroxy-contained monomer in the polymer as prepared was 2-hydroxy ethyl methacrylate. 100 g. of acrylonitrile, 10 g. of 2-hydroxy ethyl methacrylate and 90 g. of butadiene were mixed using 0.7 g. of ditertiary butyl peroxide as a catalyst and polymerized at 120° C. for 18 hours. Polymer yield was 63%.

*Example 9*

A polymer was prepared as in Example 8 but the monomer ratios were different. 80 g. of acrylonitrile, 30 g. of 2-hydroxy ethyl methacrylate and 90 g. of butadiene were mixed using 0.7 g. of ditertiary butyl peroxide as a catalyst and polymerized at 120° C. for 18 hours. Polymer yield was 59%.

What is claimed is:

1. A magnetic recording medium including a support and a coating on said support, said coating consisting of finely divided magnetic particles dispersed in an organic binder, said organic binder comprising a copolymerized mixture of acrylonitrile, butadiene and a member selected from the group consisting of 2-hydroxy ethyl methacrylate and 2-hydroxy propyl methacrylate.

2. The tape of claim 1 wherein the binder contains from about 20% to 80% by weight of acrylonitrile, about 20% to 60% by weight butadiene and from about 3% to 30% by weight of the hydroxy methacrylate.

References Cited by the Examiner

UNITED STATES PATENTS

| | | | |
|---|---|---|---|
| 2,628,929 | 2/1953 | Persoon et al. | 154—97.5 |
| 2,681,897 | 6/1954 | Frazier et al. | 260—45.2 |
| 2,688,008 | 8/1954 | Chaney et al. | 260—45.5 |
| 2,929,806 | 3/1960 | Marvel et al. | 260—80.7 |
| 2,950,270 | 8/1960 | Chapin et al. | 260—80.7 |
| 2,952,557 | 9/1960 | Charron | 117—4 |
| 3,041,320 | 5/1961 | Chapin et al. | 260—82.1 |
| 3,059,024 | 10/1962 | Goldberg et al. | 260—86.1 |
| 3,109,749 | 11/1963 | Ricco | 117—72 |
| 3,172,776 | 3/1965 | Manley | 117—93.2 |
| 3,200,007 | 8/1965 | Flowers | 117—138.8 |

FOREIGN PATENTS

| | | |
|---|---|---|
| 648,878 | 9/1962 | Canada. |
| 847,347 | 9/1960 | Great Britain. |

WILLIAM D. MARTIN, *Primary Examiner.*

JOSEPH S. SCHOFER, *Examiner.*

W. HOOVER, W. D. HERRICK, *Assistant Examiners.*